United States Patent [19]
Shepherd

[11] 4,166,591
[45] Sep. 4, 1979

[54] LEVEL WIND FOR FISHING REEL
[75] Inventor: Bob G. Shepherd, West Columbia, S.C.
[73] Assignee: Shakespeare Company, Columbia, S.C.
[21] Appl. No.: 927,572
[22] Filed: Jul. 24, 1978
[51] Int. Cl.² ............................................. A01K 89/01
[52] U.S. Cl. .......................................... 242/84.21 A
[58] Field of Search ............... 242/84.21 A, 84.21 R, 242/84.2 A

[56] References Cited
U.S. PATENT DOCUMENTS

| | | | |
|---|---|---|---|
| 3,093,340 | 6/1963 | Mauborgne | 242/84.21 A |
| 3,298,629 | 1/1967 | Small | 242/84.2 A |
| 3,322,370 | 5/1967 | Siegrist | 242/84.21 A |
| 3,554,459 | 1/1971 | Matsui | 242/84.21 A |

*Primary Examiner*—Billy S. Taylor
*Attorney, Agent, or Firm*—Hamilton, Renner & Krenner

[57] ABSTRACT

A level wind mechanism for a spinning reel having a flyer (32) (132) rotatable on the spool shaft (26) (126) with a notch (37) (137) for catching and winding the line on the spool (33) (133). The shaft is axially movable to open the spool and release the line for casting. The spool is axially reciprocated to level wind the line by a key (40) (140) slidable in the spool shaft and eccentrically connected to the drive gear (18) (118).

12 Claims, 13 Drawing Figures

4,166,591

LEVEL WIND FOR FISHING REEL

TECHNICAL FIELD

In fishing reels it is desirable to provide mechanism for leveling the line as it is wound on the spool during retrieval following a cast of the lure on the end of the line.

BACKGROUND ART

Certain prior level wind mechanisms for fishing reels have been constructed so that the eccentric load applied by the line to the flyer when reeling in a fish is transmitted to the level wind mechanism, causing frictional resistance therein which is increased by the presence of accumulated sand and grit. In such prior mechanisms, for example, as disclosed in U.S. Pat. Nos. 2,776,803 and 3,018,979, the flyer is mounted on the spool shaft in front of the spool and the shaft is driven by the drive gearing to rotate the flyer and actuate the level wind mechanism. Such prior constructions are also relatively complicated and expensive.

DISCLOSURE OF INVENTION

It is an object of the present invention to provide a simple, compact and inexpensive fishing reel having an improved level wind mechanism.

Another object is to provide an improved level wind mechanism in which the flyer is positioned to the rear of the line spool for direct drive by the drive gear which also actuates the level wind mechanism.

A further object is to provide a level wind mechanism which is not affected by the eccentric loading applied by the line to the flyer when reeling in a fish.

These and other objects are accomplished by the improvements comprising the present invention, preferred embodiments of which are shown by way of example in the accompany drawings and described in the specification as illustrating the best known mode of carrying out the invention.

PREFERRED EMBODIMENTS FOR CARRYING OUT THE INVENTION

Figure 1:
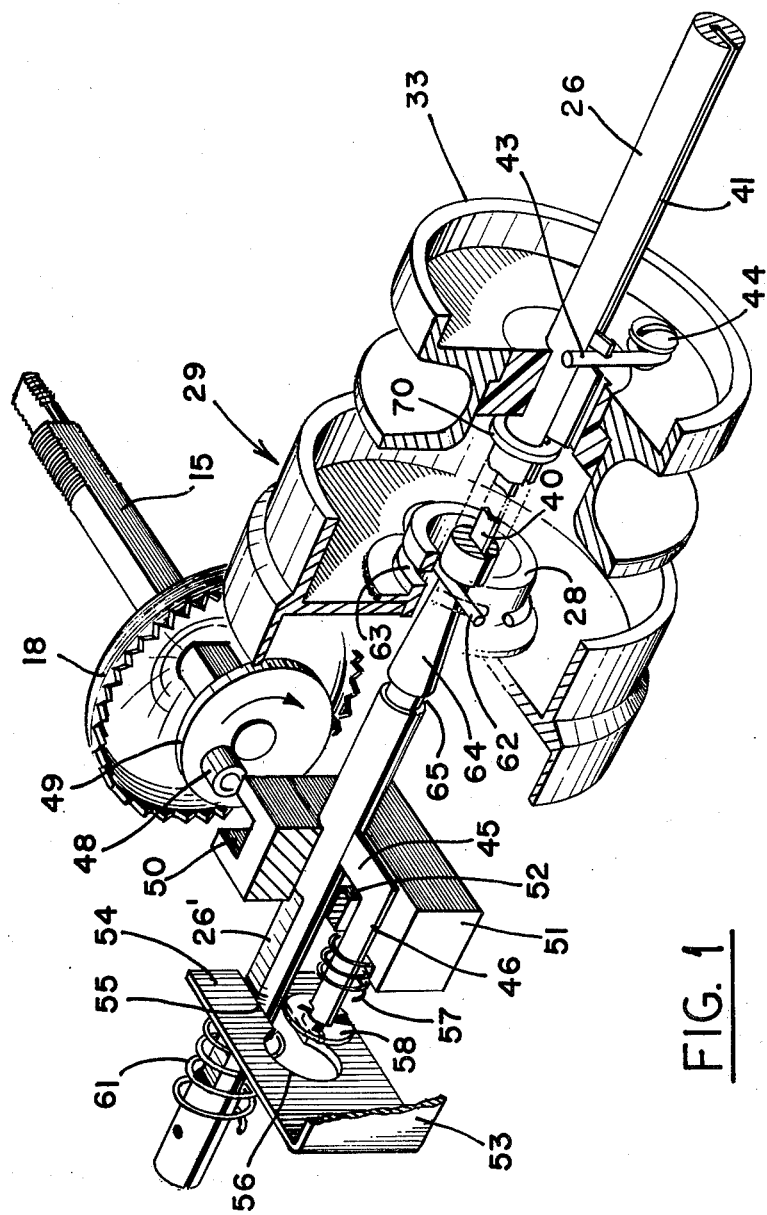
FIG. 1 is an exploded perspective view, partly in section, showing an open face fishing reel having a preferred embodiment of the improved level wind mechanism.

Referring first to the embodiment of FIGS. 1–5, the reel comprises a drive shaft 15 rotatable in a bushing 16 mounted in a housing 17 and having a drive gear 18 secured on its inner end. The outer end of the shaft 15 has a handle 19 secured thereon, and a star wheel drag 20 is adjustably mounted on the shaft for bearing against a spring washer 21 which applies axial pressure to bushing 16. The inner end of the bushing 16 bears against a washer 22 and a friction washer 23 is interposed between washer 22 and drive gear 18 to provide an adjustable amount of drag on the line when playing a fish.

The drive gear 18 meshes with a pinion 24 journaled on a bushing 25 preferably of plastic material in which the spool shaft 26 is mounted for axial sliding movement, and the pinion gear is non-rotatively secured in a flanged bushing 28 forming the hub of the cup-shaped flyer indicated generally at 29 having a rearwardly extending skirt 30 encircling a mounting plate 31 fixed on bushing 25, and a forwardly extending cylindrical flange 32. The spool 33 has a hub 34, preferably of plastic material which is axially slidable but not rotatable on spool shaft 26. A cup-shaped front flange or cover 35 is rotatably mounted on a hub 36 screwed on the front end of spool shaft 26.

In operation, rotation of the drive gear 18 rotates the flyer 29 around the stationary spool 33 and a notch 37 in flange 32 engages the line and wraps it around the spool 33 to retrieve the line as it slides over the beaded rim of the cover. The use of a notch such as notch 37 to engage and wind the line on the spool in an open face reel is more fully described in my copending application Ser. No. 927,460, filed concurrently herewith and entitled "Open Face Spinning Reel with Notched Flyer." For casting, the cover and spool are moved to the open position of FIGS. 4 and 5 wherein the line disengages from notch 37 and pays out freely from the spool.

The improved level wind mechanism comprises a key 40 slidably mounted in a longitudinal keyway 41 in the spool shaft 26, the front end of the key extending through an axial slot 42 in hub bushing 34 and secured to the spool shaft by a wire pin 43 fitting in a notch in the key and having its outer end detachably secured to the spool by a screw 44 (FIG. 1). The rear end of the key is L-shaped having a radial portion 45 connected to a longitudinal portion 46.

The key 40 is reciprocated in the keyway by means of a roller pin 48 mounted eccentrically of the drive gear on a plate 49 secured to the drive shaft inside of the drive gear. The pin is slidably received in a transverse slot 50 in an angle block 51 (FIG. 1) slidable on the spool shaft 26 and having a portion 52 normally abutting the rear edge of the radial portion 45 of the key. A Z-shaped spring biasing plate 53 is secured at its forward end to mounting plate 31 and its rearward end portion 54 extends transversely of spool shaft 26 and is slotted at 55 to straddle the flatted portion 26' of the shaft. The slot 55 terminates in a curved opening 56 through which portion 46 of the key projects rearwardly, and a helical spring 57 encircling portion 46 extends through the opening 56 and abuts portion 52 of the block. The rear end of the spring 57 abuts a washer 58 secured on the rear end of portion 46 of the key.

Figure 2:
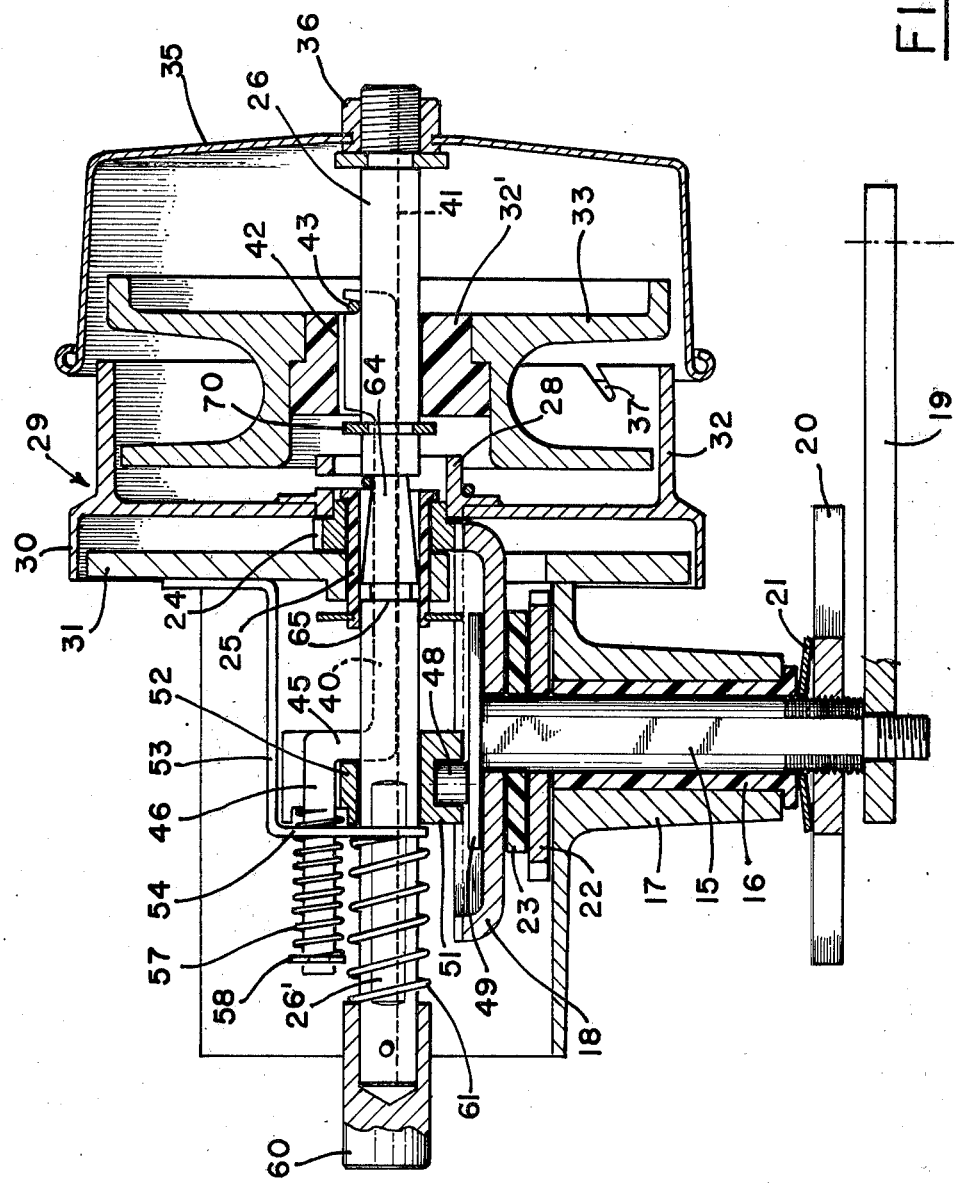
FIG. 2 is a sectional view of the assembled reel, rotated 90° from FIG. 1, showing the level wind and spool in the rearward or retracted position with the front flange or cover closed.

Accordingly, as the drive shaft is rotated to retrieve the line, the block 51 moves the key and the spool connected thereto longitudinally from the position of FIG. 2 to the position of FIG. 3 and back again. On the return stroke, the abutment of portion 52 of the block with the spring 57 moves the key and spool back to the position of FIG. 2. This reciprocation of the spool as the flyer is rotating acts to level wind the line around the spool.

Figure 3:
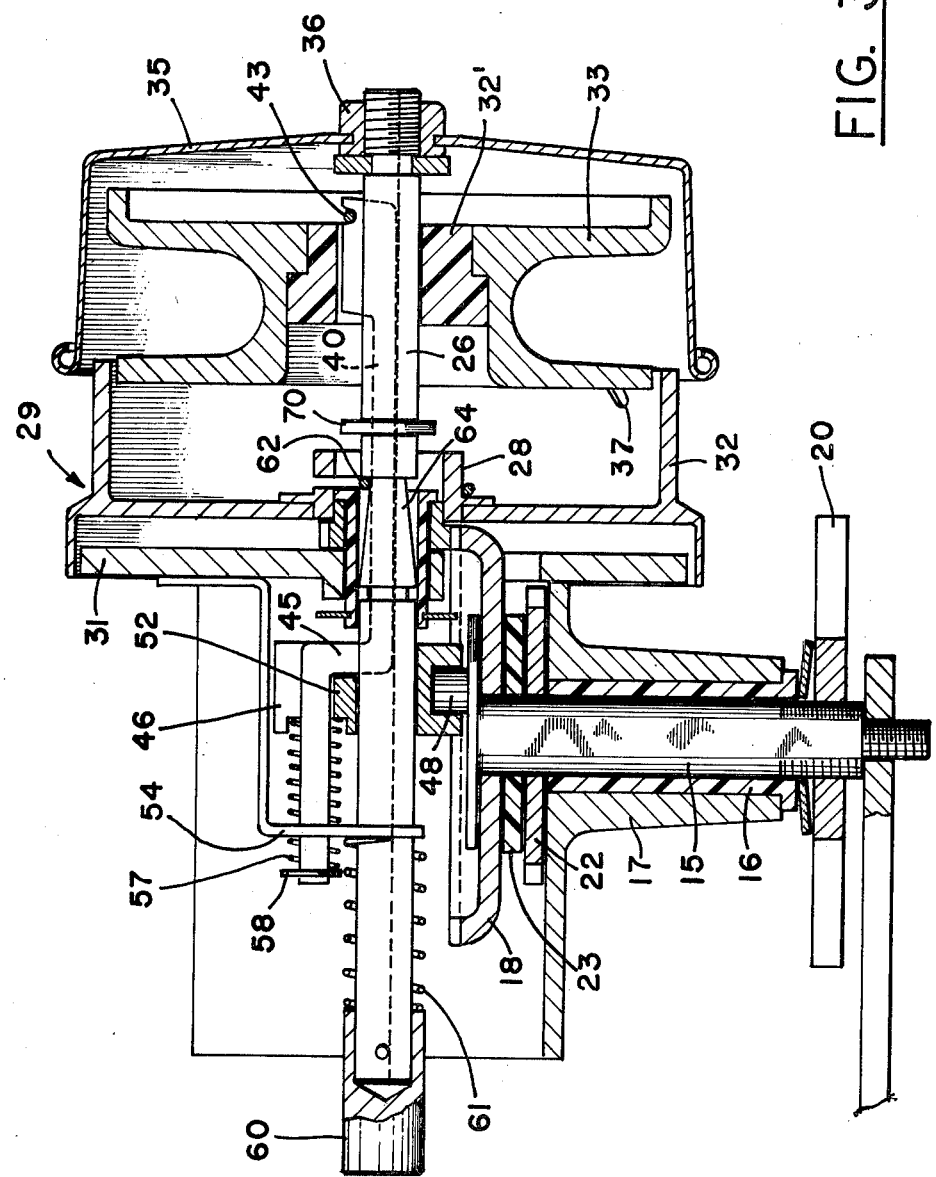
FIG. 3 is a similar view showing the level wind and spool in the forward or extended position.
Figure 4:
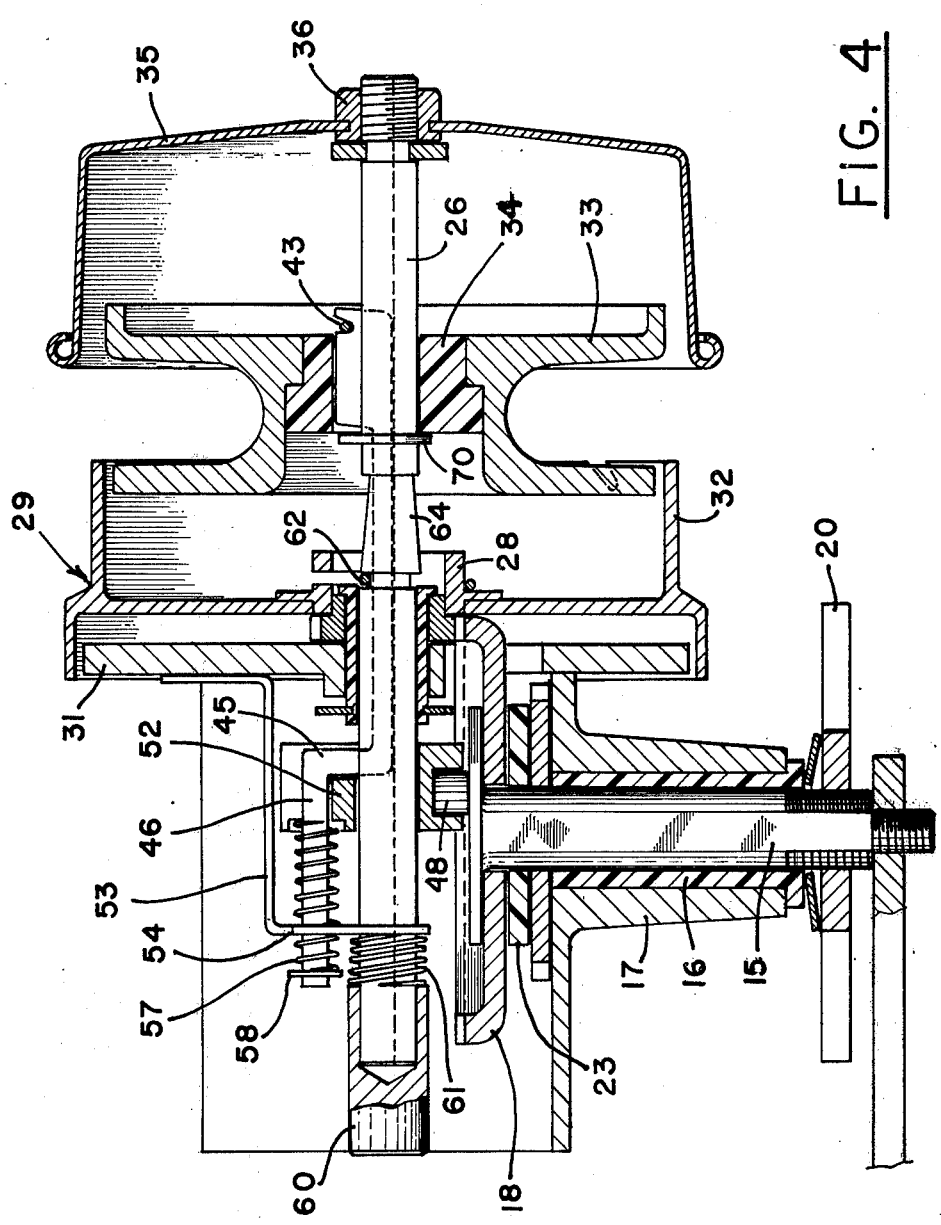
FIG. 4 is a view similar to FIG. 3 with the front flange moved to open position for casting.
Figure 5:
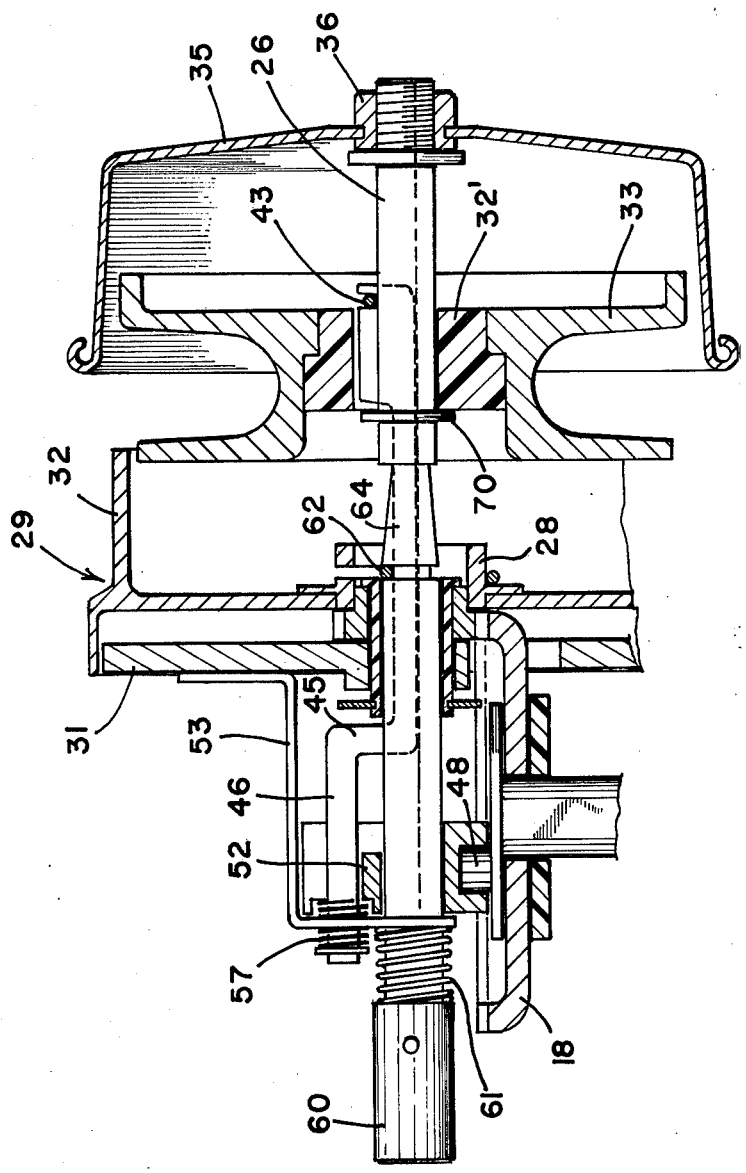
FIG. 5 is a view similar to FIG. 4 with the level wind and spool in the rearward or retracted position.
Figure 6:
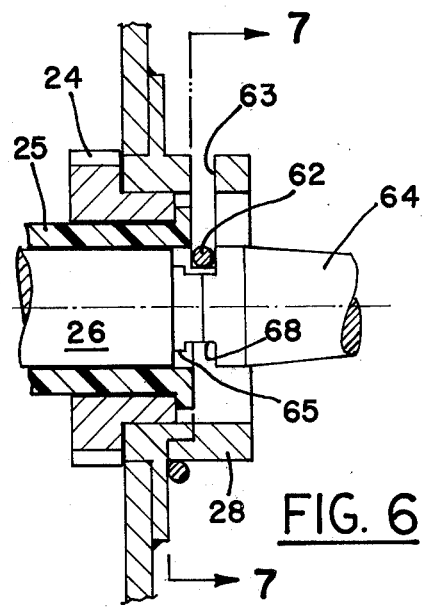
FIG. 6 is an enlarged fragmentary view of a portion of FIG. 5, showing the means for holding the spool shaft in the casting position.

For casting, the spool and cover are moved to the open position of FIGS. 4 and 5 and held in that position until the drive shaft is again rotated to retrieve the line. For this purpose the rear end of the spool shaft has a push button sleeve 60 secured thereon which normally projects outwardly of the housing as indicated in FIGS. 2 and 3. A helical spring 61 encircles the shaft between the push button 60 and the end portion 54 of the biasing plate 53. In the retrieving position of FIGS. 2 and 3 the spool shaft is held against the rearward biasing action of spring 61 by a pin 62 which comprises the end portion of a tensioned wire secured to the bushing 28 and extending through a slot 63 therein to abut a shoulder formed in the spool shaft at the small end of a tapered portion 64. A groove 65 is formed in the shaft at the large end of the tapered portion for a purpose to be described.

In order to open the reel for casting, the fisherman presses the push button 60 forwardly, compressing spring 61 and moving the tapered portion 64 of the shaft forwardly until the pin 62 snaps into the groove 65, in which position the spool and cover are locked in the open or casting position of FIGS. 4 and 5. When the flyer 29 is again rotated to start retrieving the line, the construction of the groove 65 is such as to release the pin 62 and allow the spring 61 to return the spool shaft to the position of FIGS. 2 and 3. This construction and operation is depicted in FIGS. 6-11.

Figure 7:
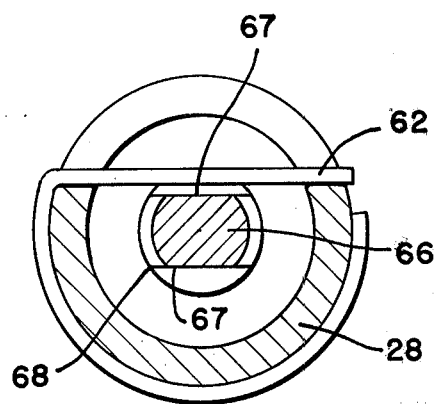
FIG. 7 is a cross-sectional view on line 7—7 of FIG. 6.
Figure 8:
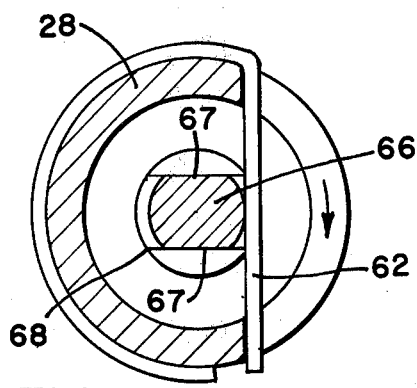
FIGS. 8, 9 and 10 are similar views showing the holding means at progressive stages of rotation of the flyer.
Figure 9:
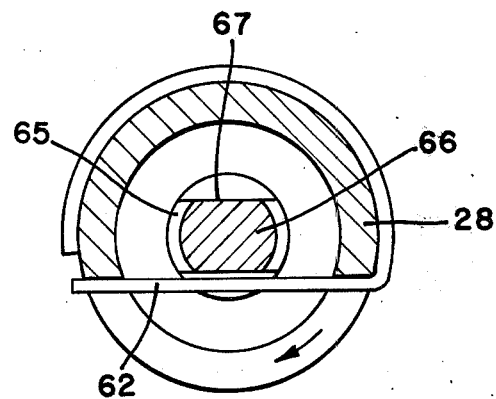
Figure 10:
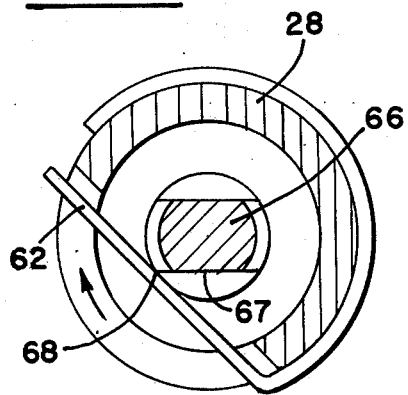
Figure 11:
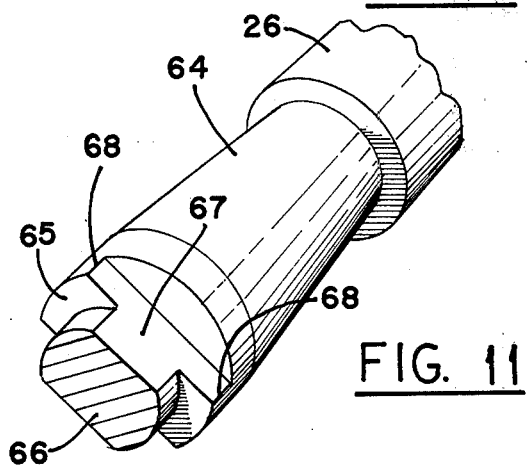
FIG. 11 is a fragmentary perspective view of that portion of the spool shaft which is engaged by the holding means.

The diameter of the shaft portion 66 at the bottom of the groove 65 is such as to allow the pin 62 to drop into the groove and abut the large end of portion 64 when the shaft is pushed forwardly regardless of what position of rotation the flyer bushing 28 is in at the time, as indicated in FIGS. 7-9, thus holding the shaft in its forward position. The flatted portions 67 on portion 66 extend axially forward of the slot to form cam edges 68 at the outer circumference of shaft portion 64.

Thus, as the bushing 28 is rotated the pin 62 moves over one of the flat surfaces 67, as in FIG. 7 or FIG. 9, and the spring 61 pulls the shaft rearwardly until the pin abuts the shoulder at the forward end of the surface. Further rotation causes a cam edge 68 to move the pin radially outward as in FIG. 10 and allow the spring 61 to return the spool shaft to the position of FIGS. 2 and 3. The construction and operation of the lock and release mechanism is similar to that shown in U.S. Pat. No. 3,051,409.

If at the time the spool shaft is pushed forwardly for casting, the eccentric roller pin 48 is in the forward position of FIGS. 3 and 4, the spool 33 is in its forward or open position, and the forward motion of the spool shaft moves the cover flange 35 to the open position as shown. If, however, the eccentric pin 48 is in the rearward position of FIGS. 2 and 5, or an intermediate position, means must be provided to move the spool 33 forward together with the key 40 which is attached to the spool.

For this purpose, a slotted washer 70 is secured on the forward portion of spool shaft 26 immediately behind the hub 32 of the spool shaft in the retracted position of the spool with the cover closed, as seen in FIG. 2. Now, when the spool shaft is pushed forwardly to open the cover, the washer 70 abuts the hub 32 and moves it forwardly to the open position of FIG. 5, and the key 40 moves with the spool compressing spring 57 against block 52. When the spool shaft is released and returned by spring 61, spring 57 returns the key and spool to the position shown in FIG. 2.

Figure 12:
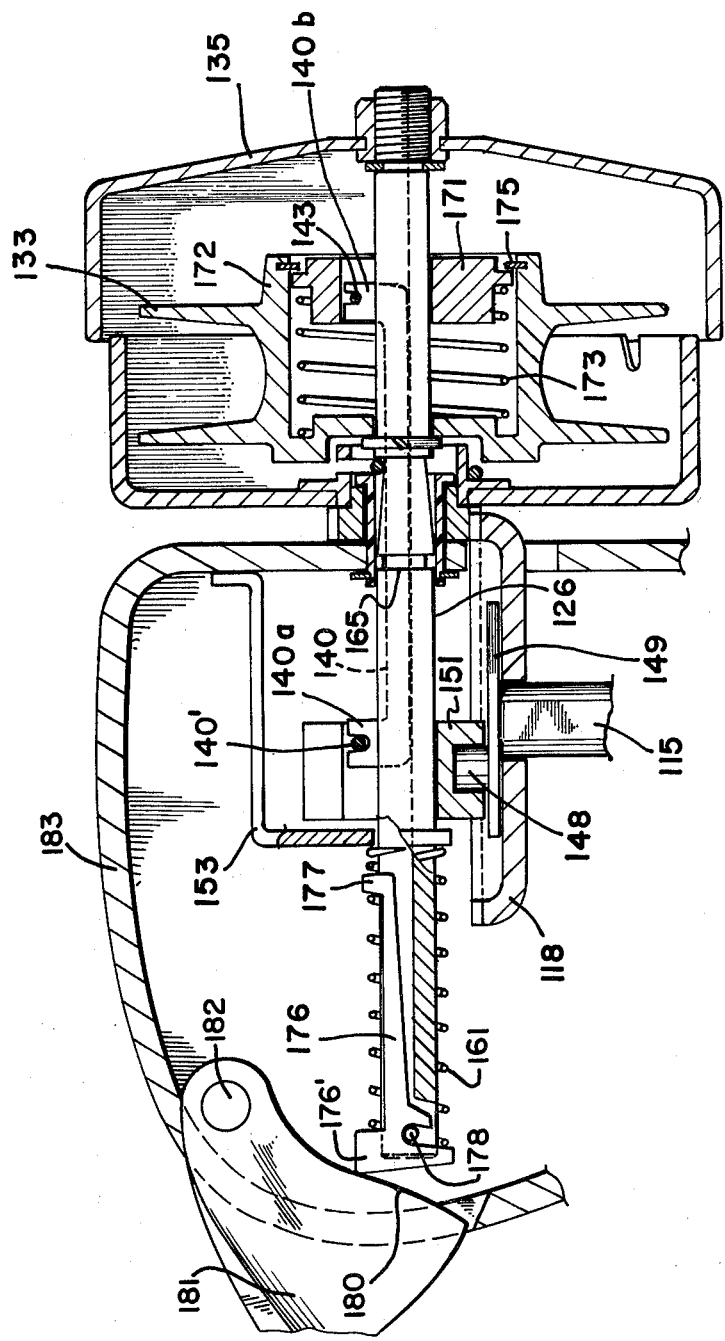
FIG. 12 is a sectional view of a fishing reel having another embodiment of the improved level wind mechanism, showing the level wind and spool in the rearward position with the front flange closed.
Figure 13:
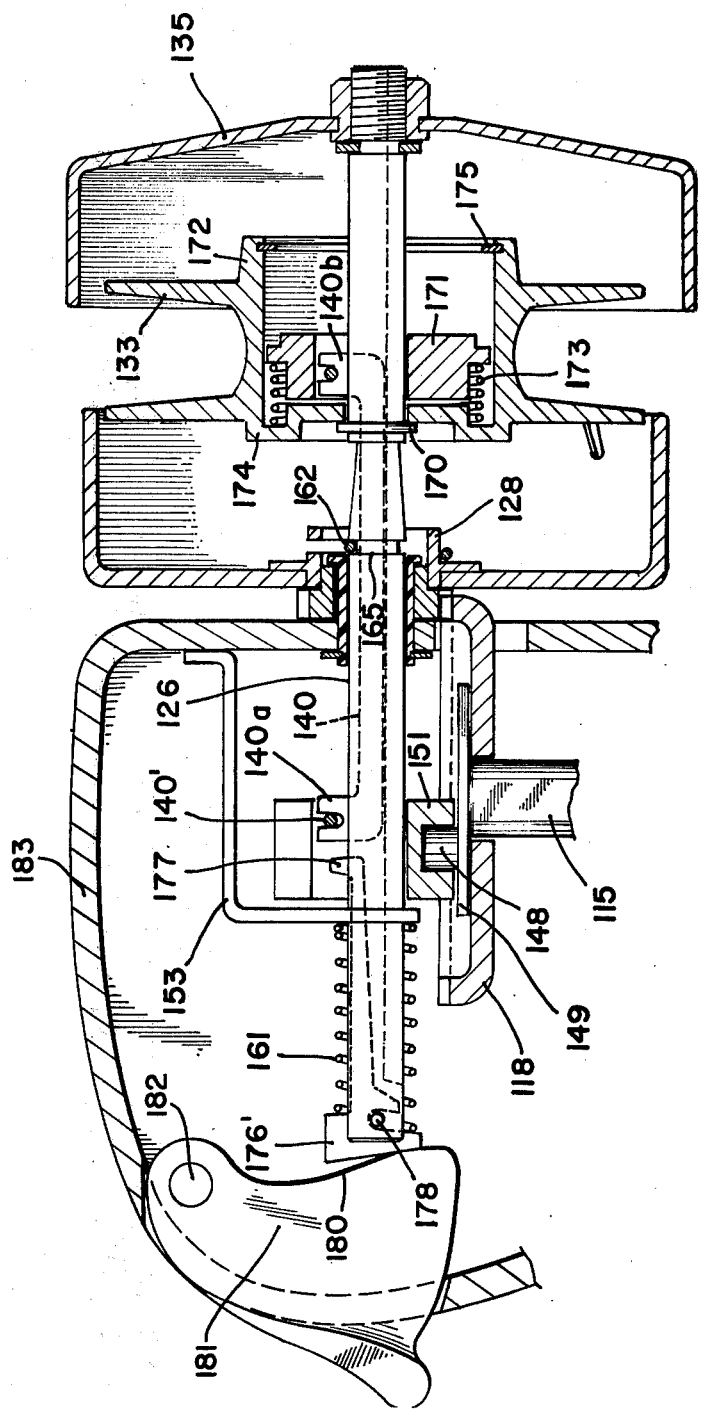
FIG. 13 is a similar view with the spool and the front flange moved to open position for casting.

In the embodiment of FIGS. 12 and 13, the eccentric roller pin 148 mounted on plate 149 secured to the drive shaft 115 is slidably received in slotted block 151 which is axially slidable on spool shaft 126. The key 140 is slidable in a keyway in spool shaft 126 and has a radial projection 140a at its rear end extending into a slot in block 151 and is secured to the block by a pin 140'. A similar projection 140b on the front end of the key is secured by a pin 143 in a slot in a plug 171 slidable on shaft 126 within the hollow hub 172 of spool 133.

The plug 171 is biased forwardly, together with the key 140 secured thereto, by a helical compression spring 173 interposed between the plug and the back wall 174 of the spool, and the forward motion of the plug is restrained by a ring 175 secured in the front end of the hub. The spool shaft 126 is movable axially forward by a push button (not shown) movably mounted on the gear housing for abutting the rear end of the shaft for moving the cover 135 to the open position of FIG. 13 for casting. A compression spring 161 is interposed between biasing plate 153 and the end 176' of a safety latch lever 176 pivoted in the keyway in shaft 126. In the casting position, the shaft 126 is held selectively against the rearward biasing action of spring 161 by a pin 162 on the flyer bushing 128 in the same manner as in the embodiment of FIGS. 1-11.

The latch lever 176 has a tab 177 on its front end, and in the closed or retrieving position of FIG. 12, the pressure of spring 161 on the rear end 176' rocks the lever on pivot pin 178 to extend the tab 177 between two front coils of spring 161, where it prevents forward axial movement of shaft 126 in response to the pull of a fish on the line, which would otherwise tend to open the cover 135 and allow the line to become disengaged from the notch in the flyer.

When the top rear corner of end 176' of lever 176 is abutted by the cam edge 180 of the push button 181 as the button is pressed inwardly to swing about its pivot 182 on the rear end of housing 183, the lever 176 rocks against the spring 161 and depresses the tab 177, allowing the tab to pass by the biasing plate 153 as the shaft moves forward to the position of FIG. 13. When the push button is released, the pressure of spring 161 on end 176' again rocks the tab 177 upwardly.

When the drive gear is rotated to retrieve the line, the block 151 reciprocates the key 140, and the plug 171, spool 133 and spring are reciprocated as a unit to level wind the line on the spool. When the shaft 126 is pushed forwardly for casting, the pin 162 snaps into the groove 165 in the shaft, detachably locking the shaft and cover 135 in the open position of FIG. 13. If at the time the spool shaft is pushed forwardly, the eccentric block 151 is in its forward position, the spool is in its forward position, and the shaft moves only the cover to the open position. If, however, the block 151 is in its rearward position of FIG. 12, or an intermediate position, the washer 170 secured to the shaft behind the spool abuts the back wall 174 of the spool and pushes it forwardly to open position, compressing spring 173, as shown in FIG. 13.

When the flyer is rotated to start retrieving the line, the camming action of groove 165 as described in connection with groove 65 in the embodiment of FIGS. 1–11 will release the pin 162 from groove 165 and allow the spring 161 to return the spool shaft to the position of FIG. 12, which allows the spring 173 to expand and return the spool to the position of FIG. 12. As the shaft 126 moves rearwardly, the inclined rear surface of tab 177 cams past the plate 153 and the pressure of spring 161 on end 177 rocks it to the retaining position of FIG. 12 between the front spring coils.

Obviously, the latch lever 176 can be applied to the embodiment of FIGS. 1–11.

It should be apparent that a simple, compact and inexpensive reel has been provided having an improved level wind mechanism which is not affected by the eccentric loading applied by the line to the flyer.

I claim:

1. In a fishing reel having a spool shaft and a spool non-rotatable and axially slidable thereon, a flyer rotatable on said shaft behind said spool, a housing, and drive gear means in said housing directly connected to said flyer, a level wind drive block eccentrically connected to said drive gear, a key axially slidable in said shaft connected to said drive block and said spool whereby rotation of said drive gear reciprocates said spool, spring means biasing said spool rearwardly, and spring means biasing said spool shaft rearwardly.

2. In a fishing reel as described in claim 1, wherein the spool shaft is axially movable forwardly selectively, means to move said spool shaft axially forward, and means on the shaft to abut the spool to move it forwardly with the shaft to casting position.

3. In a fishing reel as described in claim 2, wherein means on the flyer detachably engages cooperating means on the spool shaft to lock it in forward position.

4. In a fishing reel as described in claim 3, wherein cooperating means on the spool shaft releases the shaft when the flyer is rotated.

5. In a fishing reel as described in claim 1, wherein the spool shaft is axially movable forwardly, means on the shaft to abut the spool to move it forwardly with the shaft to casting position, and wherein the key has a rear end and the spring means biasing the spool is interposed between the drive block and the rear end of said key.

6. In a fishing reel as described in claim 5, wherein the spring means interposed between the drive block and the rear end of said key biases the key into abutment with said block and yieldingly permits the key to move forwardly with the shaft for moving the spool to casting position.

7. In a fishing reel as described in claim 1, wherein the spool shaft is axially movable forwardly, means to move said spool shaft axially forward, means on the shaft to abut the spool to move it forwardly with the shaft to casting position, and wherein the key is connected at its front end to a plug axially slidable on said shaft and slidable rearwardly in said spool, and the spring means biasing the spool rearwardly is interposed between said plug and said spool.

8. In a fishing reel as described in claim 7, wherein means on the flyer detachably engages cooperating means on the spool shaft to lock it in forward position.

9. In a fishing reel as described in claim 8, wherein cooperating means on the spool shaft releases the shaft when the flyer is rotated.

10. In a fishing reel as described in claim 1, wherein the spool shaft is axially movable forwardly selectively, means on the shaft to abut the spool to move it forwardly with the shaft to casting position, and wherein means is provided normally preventing forward axial movement of said spool shaft.

11. In a fishing reel as described in claim 10, wherein said last means comprises a fixed biasing plate and a releasable tab mounted in said spool shaft normally restrained by said plate to prevent forward axial movement of said spool shaft.

12. In a fishing reel as described in claim 11, wherein said tab is released by axial pushing on the end of said spool shaft and is automatically returned to retaining position when the shaft is returned rearwardly.

* * * * *